Jan. 15, 1935.  C. R. NIKLASON  1,988,392
ICE CREAM CONE
Filed Sept. 25, 1933
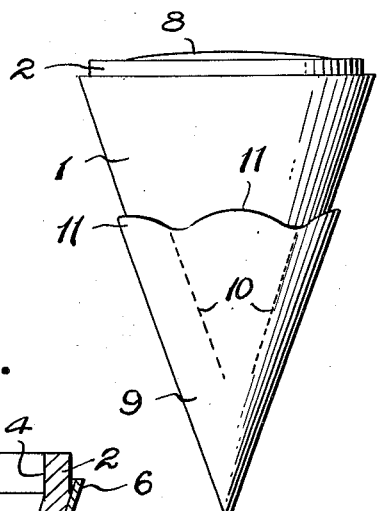
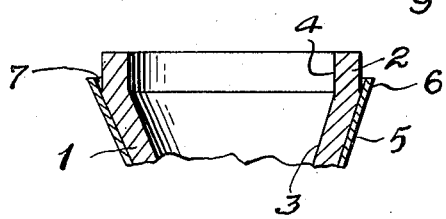
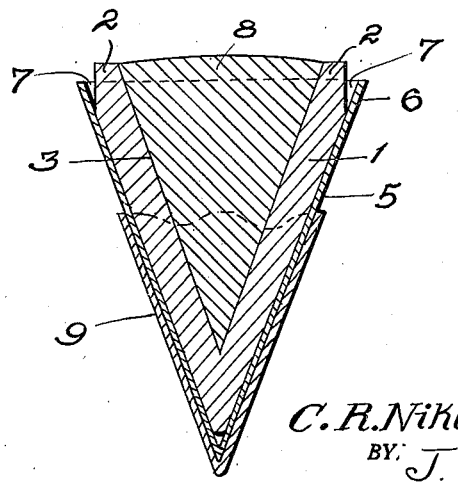
INVENTOR:
C. R. Niklason
BY J. T. Newton
ATTORNEYS.

Patented Jan. 15, 1935

1,988,392

UNITED STATES PATENT OFFICE 1,988,392

ICE CREAM CONE

Clarence R. Niklason, Washington, D. C.

Application September 25, 1933, Serial No. 690,935

2 Claims. (Cl. 99—16)

This invention relates to improvements in confections, such as ice-cream cones and the like, which are dispensed in edible containers. Ordinarily, in dispensing confections of this character, the edible containers are filled by ladling the ice-cream from loose bulk held in large receptacles. In this method of serving the ice-cream there is a loss of the material and considerable time is required in the ladling operation. Furthermore, the repeated opening and closing of the large receptacle exposes the ice-cream to unsanitary conditions and it also softens when exposed to the higher outside temperature.

One of the objects of the present invention is to do away with the large bulk supply of loose ice-cream. This is accomplished by previously molding and freezing the bulk material into service portions, the individual portions being shaped to fit the conically shaped edible containers, which are supplied in stacks to the dealer. The containers are uniform as to size and dimensions and a like uniformity is imparted to the service portions. The ice-cream cones can be prepared in large quantities at a central station and distributed to the retail dealers, or a dealer can mold and freeze his own supply of the cones. The previously prepared cones can be kept in a suitable refrigerator and in dispensing the same it is only necessary to slip one of the frozen cones into an edible container, ready for serving.

In the formation of the ice-cream cone, it is provided with a conical recess to receive a flavoring sirup. There may be a variety of sirups, and the selected one is poured into the conical recess at the time the confection is served. As the sirup is in liquid form, it may overflow the rim of the cone onto the sides of the container to soil the hands. To avoid this, an annular receptacle is provided between the edge part of the edible container and the cone to catch the drip.

This application is a continuation-in-part of my copending application, filed September 12, 1932, Serial No. 632,842, patented September 26, 1933, No. 1,928,391. The copending application discloses the confection, also a mold and method for making the same.

In the accompanying drawing, in which similar reference characters designate corresponding parts, Figure 1 shows an elevation of a confection embodying the invention.

Figure 2 is a vertical section of the same.

Figure 3 is a detail sectional view, showing a modification.

Referring to the drawing in detail, 1 designates the ice-cream cone, which is cylindrically shaped at its butt part, as at 2. Extending into the cone is the conically shaped recess 3. The exterior and interior walls of the cone are approximately parallel, except at the cylindrical butt part 2, as shown in Fig. 2. In the modification shown in Fig. 3, the interior wall at the butt part of the cone is also cylindrical, as at 4; the thicker wall secured thereby strengthens the edge of the cone.

The edible container 5 is conically shaped throughout and fits over the conical part of the ice-cream cone, with the edge part 6 of the container offset from the cylindrical butt part 2 to form the drip receptacle 7. If the sirup 8 poured into the recess 3 of the cone should overflow, the drip would be caught by the receptacle 7 and prevented from flowing down the side of the edible container to soil the hands. To further guard against soiling the hands, a supplemental container 9 of paper is fitted over the conical end of the edible container. The supplemental container is weakened along the dotted lines 10 and between the weakened lines it is scalloped, as 11, so that the paper can be stripped as the cone is being eaten.

In the preparation of the cones, loose ice-cream is packed into a suitable mold, adapted to shape the material. Such a mold is disclosed in my copending application. While in the mold the ice-cream is tightly held and is subjected to a freezing temperature. While freezing, the material tends to expand, but as it is tightly held the tendency to expand serves to harden and solidify the cones so that they can be handled without impairing their formation. After the cones are sufficiently frozen they are removed from the mold and placed on a tray, butt down. The tray so loaded is placed in a suitable refrigerator, ready for serving. In serving a cone, a supplemental container is placed over the conical end of an edible container and the latter is slipped over the conical end of the ice-cream cone. By applying a slight pressure with the fingers the several parts are caused to adhere. The recess of the cone is then filled with the sirup selected by the purchaser.

When the cones are molded at a central distributing place, the individual cones are wrapped in paraffine paper and are placed in suitable containers to be distributed to the retail dealers.

What I claim is:—

1. A confection comprising a conical edible container and a solidified ice-cream cone fitted into the container, said cone having a cylindrical butt-part spaced from the edge part of the container to provide an annular receptacle inside of the edge part of the container to catch the drip from the cone.

2. A confection comprising a conical edible container and a solidified ice-cream cone having a cylindrical butt part and a conical part extending from the butt part and with the conical part fitting the container, said cone having a conical recess extending into the same through the butt part adapted to receive a sirup, and said butt part being spaced from the edge part of the container to provide an annular receptacle inside of the edge part of the container to catch the drip from the cone and from the sirup contained in the recess.

CLARENCE R. NIKLASON.